(12) United States Patent
Smith et al.

(10) Patent No.: US 8,967,469 B2
(45) Date of Patent: Mar. 3, 2015

(54) SYSTEM AND METHOD FOR TRACKING ITEMS BY MEANS OF LONGWAVE, MAGNETIC SIGNAL TAGGING

(71) Applicant: Ideal Innovations Incorporated, Arlington, VA (US)

(72) Inventors: Michael Smith, Leesburgh, VA (US); David Ferrell, Fairfax, VA (US); Elizabeth Wilson, Woodbridge, VA (US)

(73) Assignee: Ideal Innovations Incorporated, Arlington, VA (US)

( * ) Notice: Subject to any disclaimer, the term of this patent is extended or adjusted under 35 U.S.C. 154(b) by 0 days.

(21) Appl. No.: 13/776,206

(22) Filed: Feb. 25, 2013

(65) Prior Publication Data

US 2014/0239061 A1    Aug. 28, 2014

(51) Int. Cl.
G06F 19/00      (2011.01)
G06Q 10/08      (2012.01)

(52) U.S. Cl.
CPC .................................. *G06Q 10/0833* (2013.01)
USPC ........................................ 235/385; 235/492

(58) Field of Classification Search
USPC .................... 235/376, 385, 487, 492
See application file for complete search history.

(56) References Cited

U.S. PATENT DOCUMENTS

| | | | | |
|---|---|---|---|---|
| 5,380,994 | A * | 1/1995 | Ray | 235/462.45 |
| 7,895,131 | B2 * | 2/2011 | Kraft | 705/333 |
| 7,928,844 | B2 * | 4/2011 | Mackenzie et al. | 340/572.1 |
| 8,325,041 | B2 * | 12/2012 | August et al. | 340/572.1 |
| 8,344,879 | B2 * | 1/2013 | Harmon et al. | 340/539.13 |
| 8,658,941 | B2 * | 2/2014 | Albrecht | 219/137 R |
| 8,810,392 | B1 * | 8/2014 | Teller et al. | 340/539.32 |
| 2004/0046020 | A1 * | 3/2004 | Andreasson et al. | 235/385 |
| 2004/0124977 | A1 * | 7/2004 | Biffar | 340/539.13 |
| 2004/0238631 | A1 * | 12/2004 | Andreasson et al. | 235/385 |
| 2005/0253704 | A1 * | 11/2005 | Neuwirth | 340/539.13 |
| 2005/0258937 | A1 * | 11/2005 | Neuwirth | 340/5.92 |
| 2006/0059964 | A1 * | 3/2006 | Bass et al. | 70/408 |
| 2007/0285256 | A1 * | 12/2007 | Batra | 340/572.8 |
| 2008/0017709 | A1 * | 1/2008 | Kennedy | 235/385 |
| 2008/0061049 | A1 * | 3/2008 | Albrecht | 219/137 R |
| 2009/0072029 | A1 * | 3/2009 | Martin | 235/385 |
| 2009/0219170 | A1 * | 9/2009 | Clark et al. | 340/825.49 |
| 2010/0090004 | A1 * | 4/2010 | Sands et al. | 235/385 |
| 2010/0148937 | A1 * | 6/2010 | Howard | 340/10.6 |
| 2010/0265061 | A1 * | 10/2010 | Harmon et al. | 340/539.13 |
| 2010/0265071 | A1 * | 10/2010 | August et al. | 340/572.7 |
| 2011/0079652 | A1 * | 4/2011 | Bass et al. | 235/492 |
| 2011/0140918 | A1 * | 6/2011 | Jain et al. | 340/907 |
| 2012/0098642 | A1 * | 4/2012 | Krawczewicz et al. | 340/10.1 |
| 2012/0131828 | A1 * | 5/2012 | August et al. | 42/1.02 |

* cited by examiner

*Primary Examiner* — Paultep Savusdiphol
(74) *Attorney, Agent, or Firm* — Andrew Wichmann

(57) ABSTRACT

The invention relates to a system and method for tracking items of interest using one or more signal tags, configured to receive information and transmit information using a longwave frequency in the magnetic field. Additional components include one or more data entry devices; one or more tag readers; and one or more database components, configured to transmit information to and receive information from the one or more data entry devices and the one or more tag readers.

15 Claims, 8 Drawing Sheets

SYSTEM AND METHOD FOR TRACKING ITEMS BY MEANS OF LONGWAVE, MAGNETIC SIGNAL TAGGING

CROSS-REFERENCE TO RELATED APPLICATION

This application claims the benefit of U.S. provisional patent application No. 61/603,246.

BACKGROUND

This invention relates to a system and method for tracking an item and, specifically, tracking an item by means of long-wave, magnetic signal tagging.

Knowledge of the status of an item, such as its location, step in a production process, usage history, or completion level is valuable across a range of organizations. Shipping companies, supply chain management departments, retailers, manufacturers, toll collectors, access control providers, and asset management departments are all examples of organizations that employ systems to track the status of large number of items. Cemeteries charged with receiving, managing, laying to rest, and keeping records on large numbers of human remains also employ complex tracking systems.

Currently, organizations use a range of computerized and non-computerized systems to track items of interest. Most computerized systems affix either bar code tags or radio frequency identification ("RFID") tags to the items of interest. Barcodes carry a unique number, which can be identified with an optical scanner. When used in tracking systems, optical scanners operate at points of interest to track the presence of tagged items. Often barcode systems function in reference to external circumstances being managed by a computer system that is connected to the optical scanners. RFID tags can emit radio frequency electromagnetic signals across a wide range of the electromagnetic spectrum, from 120 kHz up to 10 GHz signals. These tags can carry encoded, unique data to identify the item to which they are affixed. Systems using RFID tags operate similarly to bar code systems, except they can carry more than a simple identification number and may often be read without line-of-sight. Non-computerized, "paper," systems operate in many different ways but typically involve assigning a unique number to each item to be tracked and requiring that number to be recorded manually on documents each time the item is checked in or out of a step in a document tracking process.

A common application of non-computerized systems is human remains tracking. In a typical system, remains are discovered and circumstances of the discovery are summarized in a report. This data might include any identification documents found on the person, the location, time of day, and a general description of the body. The remains are then taken to another location such as a morgue where further analysis is conducted, such as reviewing dental records, skeletal extraction, or DNA testing, until a satisfactory identification is completed. This information is then typically compiled into a second report. Further analysis by a medical examiner is often performed to determine the cause of death. This generates a third report. Later the remains are usually transported to a coffin or casket and information is recorded on fourth report to track which remains are contained in which caskets. Finally the remains and casket are placed in the grave and a final report is created to track the identity of the individuals in each grave at the relevant cemetery.

There are several disadvantages of current computerized and non-computerized tracking systems. With respect to computerized tracking systems, the disadvantages stem from reliance on barcodes or RFID tags. Barcodes require line-of-sight because they must be read by either image-based or laser-based optical scanners. Optical scanners also have the disadvantage of a limited range. Typical laser scanners are ineffective at distances greater than two feet and image-based scanners have an even shorter range. Signals to and from RFID tags often cannot pass through water or metals because these substances block or reflect radio frequency waves. For the same reasons, RFID signals cannot pass through other human beings. With respect to non-computerized tracking systems, the disadvantages stem from extensive reliance on human actions to create, update, account for, and preserve the numerous paper reports that arise when tracking multi-step processes. At each step in a non-computerized system, human error can lead to the misspelling of a name, transposing of a number, misplacing of a report, or mistaken destruction of a document. Furthermore even if all records are properly created, there is the continuing manual burden of managing a growing body of physical records and accurately searching and identifying desired information.

Many of these disadvantages are apparent in current human remains tracking systems. At Arlington National Cemetery ("ANC"), efforts have been underway since at least 2004 to digitize the records of human remains buried at the cemetery and improve the overall chain of custody process. Unfortunately, implementation was delayed and the cemetery continued to rely on non-computerized records. In 2008 problems resulting from ANC's record-keeping system began to come to light, including multiple servicemen being buried in the same graves, servicemen being buried in unmarked graves, reburial of remains without notification, and incorrect headstones on tombs. A 2010 report from the Department of Defense, Inspector General found that grave markers were not placed soon enough after burial, records were not kept updated, and that long-term maintenance of records was, "sloppy." An earlier 2009 report from the U.S. Army Criminal Investigative Command indicated that cemetery officials were negligent in continuing to use a paper filing system instead of a computerized database to keep track of cemetery operations.

In situations like ANC, RFID or barcode systems might be a slight improvement over non-computerized systems but would still retain significant disadvantages. The primary disadvantage results from the environmental conditions surrounding remains at cemeteries. As stated above, RFID and barcode systems require either line-of-sight at a distance of less than two feet or a lack of interference from water or metals. In cemeteries like ANC, the graves are first lined with a concrete box or an entire concrete vault is built to house the casket, and the caskets themselves are often sealed metal containers. Once the graves are covered over, groundwater typically fills the concrete structures and suspends the metal caskets in an underground pool. In addition, spouses are often housed in the same grave sites and are buried one on top of the other. The factors of depth, concrete structures, water pools, metal caskets, and stacked remains combine to block, reflect or otherwise interfere with the optical or radio frequency signals of contemporary computerized systems and render them ineffective.

SUMMARY

In accordance with the invention, interference caused by environmental conditions is overcome by a tracking system that detects tags that emit longwave magnetic signals and that are associated with the items to be tracked. The tracking system comprises one or more signal tag components, configured to receive information and transmit information using a longwave frequency in the magnetic field; one or more data entry device components, configured to receive information from and transmit information to the one or more signal tags using the longwave frequency in the magnetic field and configured to receive information and transmit information to at least one other component using one or more other transmission methods; one or more tag reader components, configured to receive information from the one or more signal tags using the longwave frequency in the magnetic field and configured to receive information and transmit information to at least one other component using one or more other transmission methods; and one or more database components, configured to transmit information to and receive information from the one or more data entry devices and the one or more tag readers.

DETAILED DESCRIPTION

The invention provides a system and method for tracking items using longwave, magnetic signal tagging. Longwave, magnetic signal tags are comprised of a crystal, a battery, and static memory. They may also contain sensors and the ability to store sensor data. Typically lithium batteries can be used, which give the tags up to a 30 year battery life at a range up to 50 feet. The tags utilize longwave (wavelengths generally around 7,500 ft) magnetic signals operating at around 131 kHz. This allows the signals to travel unaffected through most metals and liquids. The tags are active and use on-demand, peer-to-peer transceivers to send and receive short data packets in a local network. These signals can be varied for each tag such that they provide identification of the item associated with the tag. Magnetic signal tags are different from other types of electromagnetic sensors and network devices because they use the magnetic component of the electromagnetic spectrum to transfer information rather than the electric component, which is employed in standards like WiFi, Bluetooth, VHF, or UHF.

All or portions of this invention may refer to a computer-related entity, either hardware, a combination of hardware and software, or software in execution as applied to a system for tracking items. A component may be used to refer to a physical element of a system, a set or relationship of physical elements, or a process running on one or more physical elements of the system. For example, two components might be physically separated, such as a database housed on a server and a data entry device contained in its own housing, or they might be separate pieces of software running on a single piece of hardware. Also, a single process might take place on a single computer or it might be distributed between a computer localized with a database component and a computer localized with a data entry device or tag reader and connected via data packets and signals. It is generally preferable for data transfer between data entry devices, tag readers, and database components to be accomplished using wireless protocols other than those using longwave, magnetic signals. Such alternatives include WiFi, Bluetooth, UHF, or VHF or wired data transfer such as Ethernet. The primary benefit to these protocols is higher transmission speeds; however this invention does not exclude the use of longwave, magnetic signals as a means of transferring data between any components disclosed herein.

Figure 1:
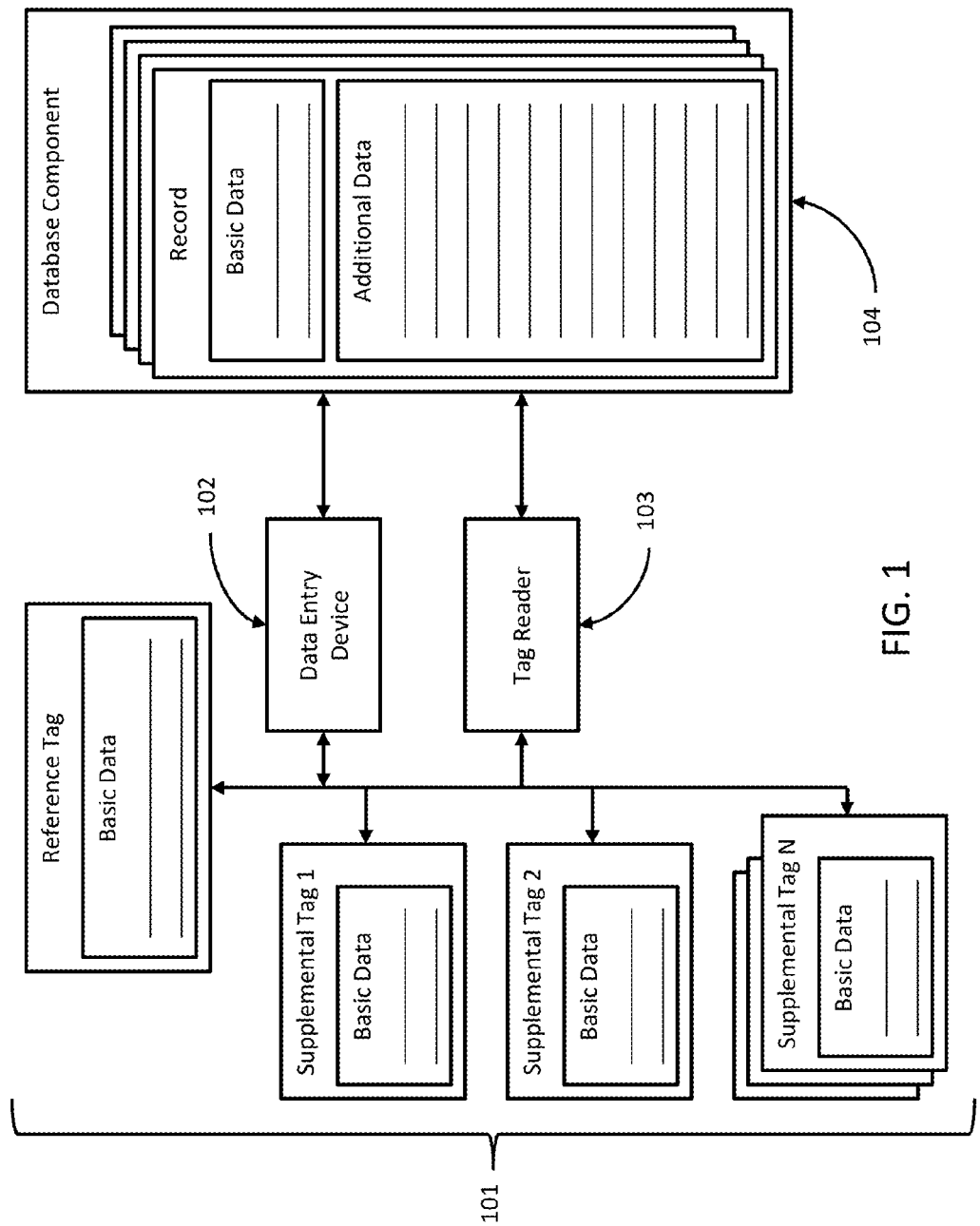
FIG. 1 is a block diagram illustrating an embodiment of the invention.

FIG. 1 is a block diagram illustrating an embodiment of the invention. This embodiment supports a system for tracking items using longwave, magnetic signal tags. The system comprises one or more signal tag components 101, configured to receive information and transmit information using a longwave frequency in the magnetic field; one or more data entry device components 102, configured to receive information from and transmit information to the one or more signal tags using the longwave frequency in the magnetic field and configured to receive information and transmit information to at least one other component using one or more other transmission methods; one or more tag reader components 103, configured to receive information from the one or more signal tags using the longwave frequency in the magnetic field and configured to receive information and transmit information to at least one other component using one or more other transmission methods; and one or more database components 104, configured to transmit information to and receive information from the one or more data entry devices and the one or more tag readers.

The signal tags 101 can include a reference tag as well as one or more supplemental tags. The reference tag serves as the primary identifying tag for a particular item. The supplemental tags can serve to identify other items that are associated with the reference tag. Each signal tag can store basic data in memory on the tag. Basic data can include information such as an identification name and number, manufacturing dates, source of manufacture, birth date, or any other information that can fit within the memory storage limits of the tag. Basic data can also include information on what other tags are associated with the tag storing the basic data. Identification of the item associated with the reference tag can be based on the basic data stored in the tag or an identifying aspect of the signal emitted by the tag.

The data entry device 102 and the tag reader 103 can be a single device or implemented on multiple devices. For example the data entry device may be a portable tablet computer having a processor and memory, and operatively connected to an antenna that monitors for longwave, magnetic signal tags. The data entry device also contains a communication means other than the longwave, magnetic signal standard such that it can be operatively connected to the database component. These might include wireless standards such as Wifi, Bluetooth, UHF, or VHF; or they might include a wired connection such as Ethernet. The tablet connects to the tag and allows the user to enter basic data to be stored on the tag via the longwave, magnetic signal. At the same time the user can connect to the database component 104 via the longwave, magnetic signal, or other communications means to create a record that links the signal emitted from the tag to the basic data entered. The user can then also enter additional data to be stored in a record in the database component. This information might include reports associated with the item of interest, warranty information about the item of interest, images, classified information, or any other information desired by a user. The quantity of information that can be stored as additional data is limited only by the storage capacity of the database component. Alternatively the tag reader could be a separate device comprised of simply an antenna to monitor the longwave, magnetic signal emitted from the tag and separate means for communicating over a different standard with the database component. The tag reader monitors an area, detects when a tag is present, and communicates that information to the database component, without serving as an access for additional data entry by a user. Lastly the tags themselves can be configured with an antenna to automatically recognize one another and store their affiliation in basic data.

Figure 2:
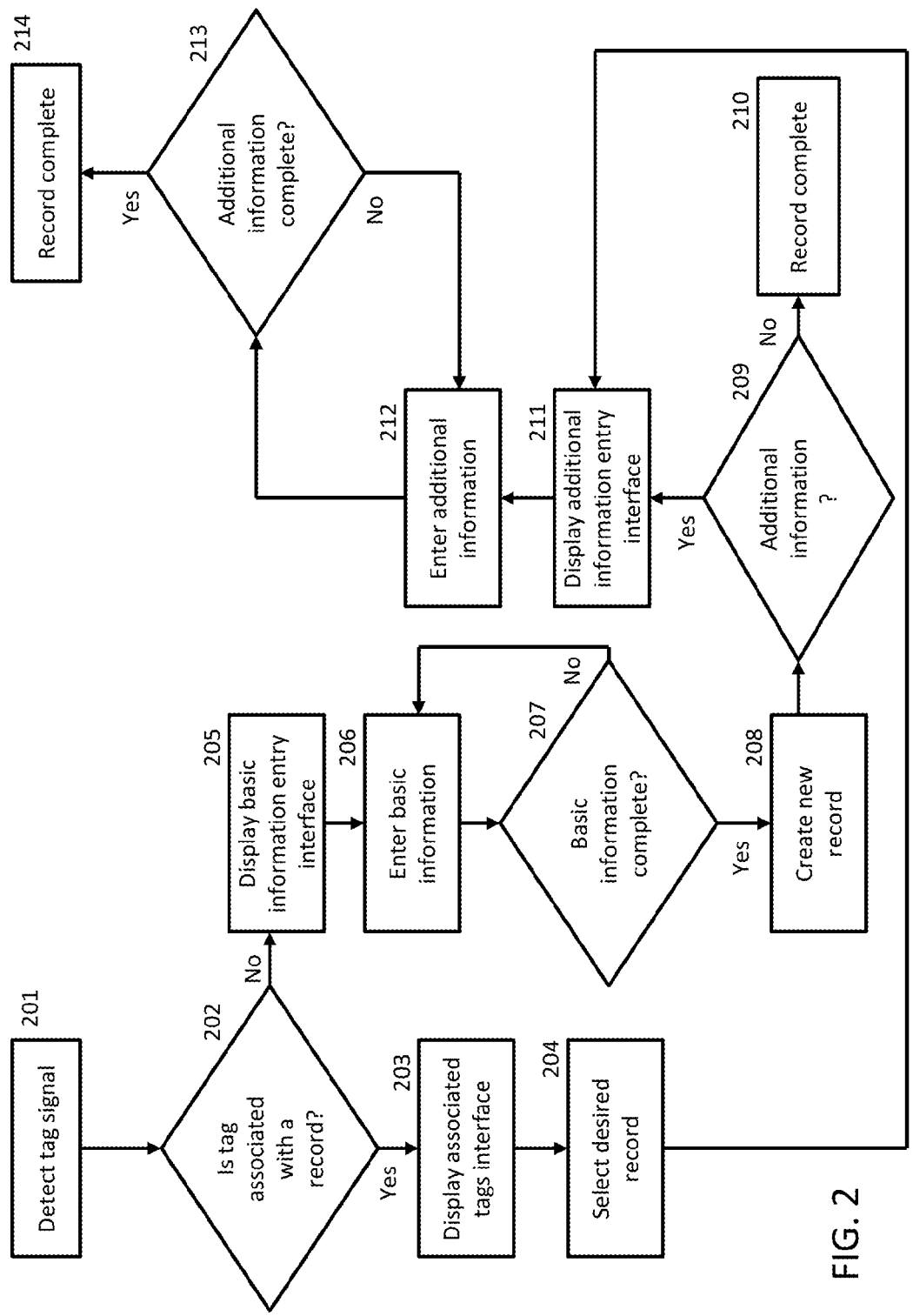
FIG. 2 is a flow diagram of a routine to create or update a record associated with a tag.

FIG. 2 is a flow diagram of a routine to create or update a record associated with a tag. The process depicted in FIG. 2 can be implemented as software running on a data entry device operatively connected to a database component or as software running on the database component and displaying on the data entry device via a communications network. The database component can be housed locally in memory stored on the data entry device or separately and connected to the database component over a communications network. In step 201 the data entry device detects a tag using an antenna capable of detecting longwave magnetic signals. In step 202 the data entry device determines whether the tag is associated with an existing record by comparing the basic data stored in the tag with basic data associated with records stored in the database component. This basic data might be a unique number or code assigned to the tag. The data entry device might also determine whether the unique aspect of the signal emitted by the tag is associated with an existing record. In step 203, if there is a record associated with the detected tag, then the data entry device displays a graphical user interface that indicates all tags stored in the database component that are associated with the detected tag. This associated tags interface can take many forms. In one example a new page of a smart phone application is displayed, which displays the basic information of the detected tag and a list of selectable buttons that each show the basic information of the associated tags. In step 204 the user may select a desired record of an associated tag, for example by tapping the selectable button associated with the desired record on a data entry device operating on a smart phone. Once a user selects the desired record, the data entry device displays, in step 211, an additional information entry graphical user interface for the selected record. In one example this interface would show all additional data already associated with the selected record and present fields or attachment options for additional information. In step 212 a user could then enter or upload any additional information desired. In step 213 the user is prompted with the question of whether the user is done entering additional information. This might be a static button located on the additional information entry interface or it might display as a window within the application after all the open fields and attachment options had been addressed. If the user selects "yes," the record is complete, the data entry device saves the record, and the process ends at step 214. If the user selects "no," then the user is prompted to enter more additional information. Back in step 202, if the data entry device determines that the tag is not associated with a record, then, in step 205, it displays a graphical user interface for the entry of basic information and creation of a new record. In step 206 the user enters basic information and in step 207 the user is prompted to determine whether the basic information is complete. If the user selects "yes", then a new record is created and the process moves on to the steps already mentioned for adding additional data. If a user selects "no", then the process returns to step 206 and prompts the user to enter further basic data.

Figure 3:
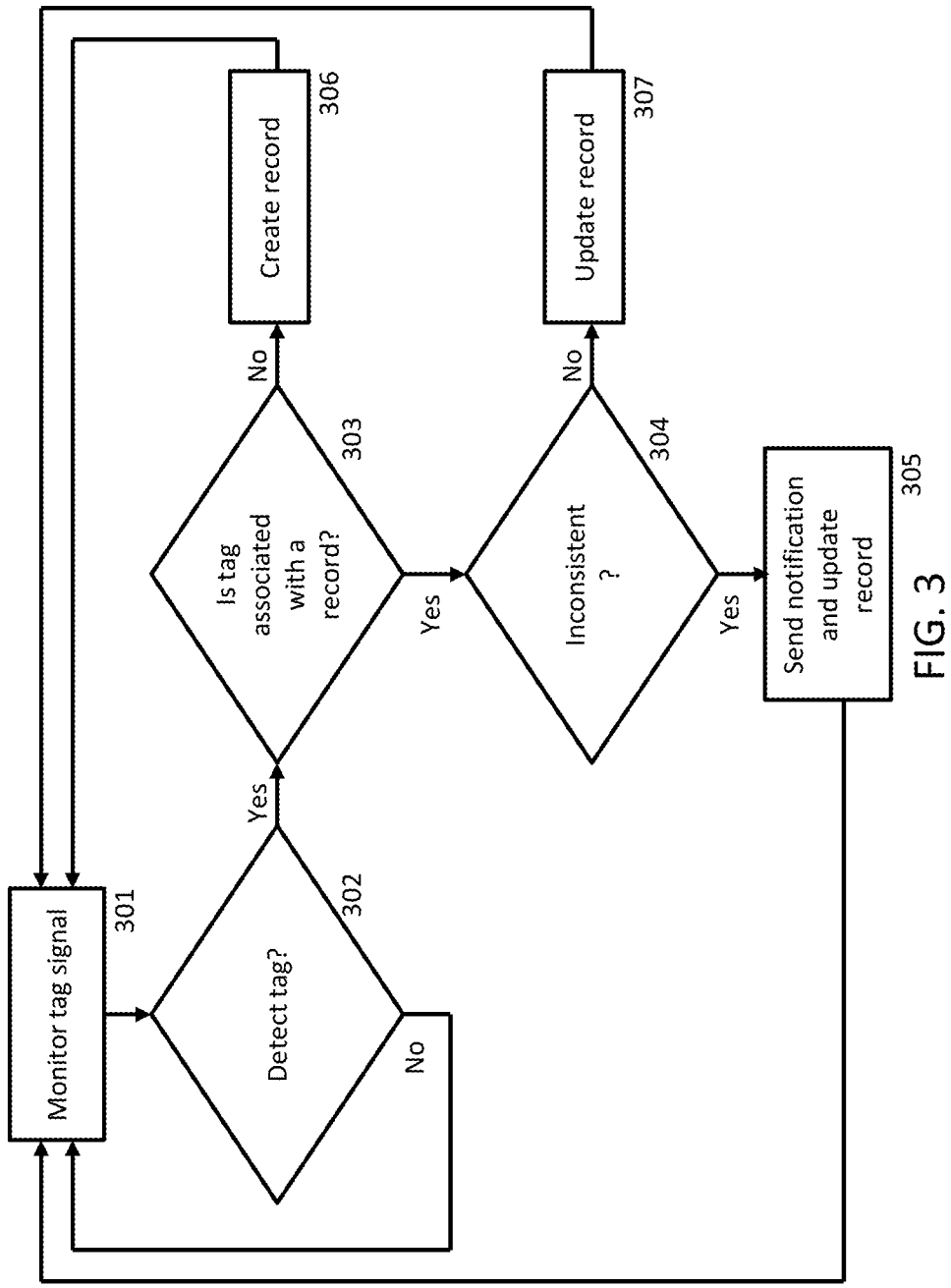
FIG. 3 is a flow diagram of a routine to detect the presence of an item and determine whether its presence is consistent with the record associated with the item.

FIG. 3 is a flow diagram of a routine to detect the presence of an item and determine whether its presence is consistent with the record associated with the item. The process depicted in FIG. 3 can be implemented as software running on a tag reader operatively connected to a database component or as software running on the database component and displaying on the tag reader via a communications network. The database component can be housed locally in memory stored on the tag reader or separately and connected to the database component over a communications network. As mentioned above, the tag reader can be a standalone device or may be a separate function of the component housing the data entry device. In step 301 the tag reader monitors an area using an antenna configured to detect longwave magnetic signals. In step 302 the tag reader determines whether it detects a tag. If it has not it returns to step 301 and continues to monitor. If it has detected a tag, then in step 303 it determines whether the tag is associated with an existing record by comparing the basic data emitted by the tag with the basic data associated with the records stored on the database component. If it is determined that the tag is not associated with a record, then the tag reader creates a record in the database component and populates the basic information of that record with the basic information contained in the tag. The tag reader then returns to step 301 and continues to monitor its area. If, in step 303, the tag reader determines that the tag is associated with an existing record, then in step 304, it compares the basic data emitted by the tag with the basic and additional data contained in the record associated with the tag on file to determine if there are inconsistencies. For example, the additional data contained in the record associated with the detected tag may indicate that the tag may not be registered at the location of this tag reader until March 1st. This could be because this particular reader might be located at the breach of an exit point and the item identified by this tag is not permitted to exit this location until March $1^{st}$. Therefore in this example, an inconsistency would be registered if the tag was read on February $21^{st}$. If an inconsistency is determined, then, at step 305, notification can be transmitted to security personnel or supply chain managers that the item is leaving the location, and the record associated with this tag can be updated to reference the inconsistency. A person skilled in the art will recognize that may other similar types of inconsistencies are possible, depending on the circumstances of the application of the system and method. If an inconsistency is not determined, then, at step 307, the record associated with that tag is updated with the information contained in the basic data.

FIGS. 4A-4H depict a chain-of-custody system for human remains embodying the principles of the invention. As described above, tracking human remains for purposes of maintaining a chain of custody is a problem that is not adequately addressed by contemporary tracking solutions. An item tracking system employing longwave, magnetic signal tags overcomes the factors of depth, concrete structures, water pools, metal caskets, and stacked remains that combine to render contemporary human remains tracking systems ineffective.

Figure 4C:
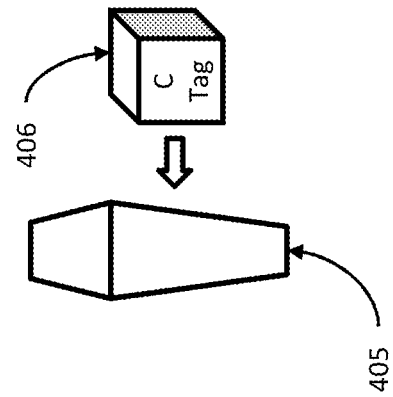
FIGS. 4A-4H depict a chain-of-custody system for human remains embodying the principles of the invention.
Figure 4B:
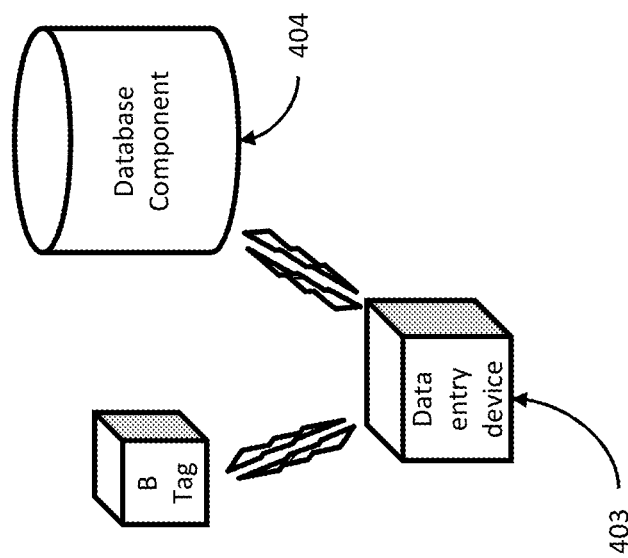
Figure 4A:
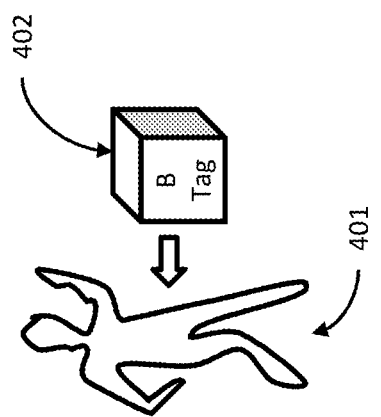

Accordingly, FIG. 4A depicts human remains 401 being associated with a longwave, magnetic signal tag 402 (the "B tag"). The B tag serves as the reference tag as described in FIG. 1. The reference tag can be associated with the item in several ways, including affixing the tag physically to the item to be tracked or placing the tag inside a container that will hold the item to be tracked. The latter approach would be most useful if the remains are found in a non-intact state and need to be kept together.

In FIG. 4B the B tag is shown operatively connected with a data entry device 403 and a database component 404. A this point the data entry device might run the process described in FIG. 2. The data entry device would read the longwave, magnetic signal emitted from the B tag and a user could enter in basic data that had been determined about the body. This information might include the name of the person, his or her next-of-kin, age, and social security number. This basic data would then be transmitted to the B tag and stored in the tag's local memory. The same basic data would also be transmitted to the database component 404 and a record would be created for the B tag that would include the basic data entered in the data entry device. The data entry device could also be used to enter in additional data about the remains. Additional data might include photos of the body, temperature readings when the body was discovered, or a full autopsy report. All the additional data could be transferred into the record stored on the database component. FIG. 4B depicts the operative connection between the data entry device and the database component as a wireless connection; however it should be understood that this connection can employ any wireless communication standard commonly known in the art such as WiFi, Bluetooth, UHF, or VHF or any wired connection such as Ethernet.

In FIG. 4C a coffin 405 is being shown associated with a longwave, magnetic signal tag 405 (the "C tag"). The C tag serves as a supplemental tag as described in FIG. 1. It should be noted that the use of a coffin is merely an example and that remains can be stored in other containers such as urns.

Figure 4E:
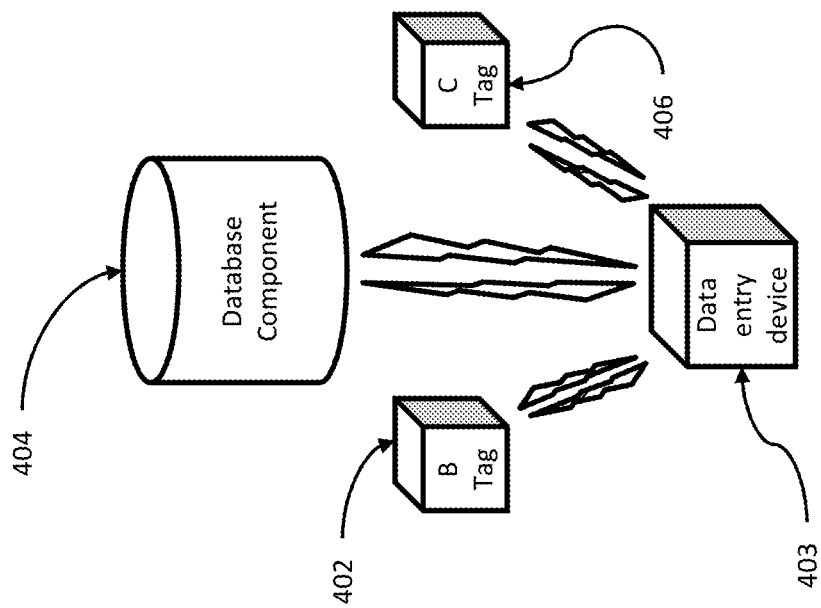
Figure 4D:
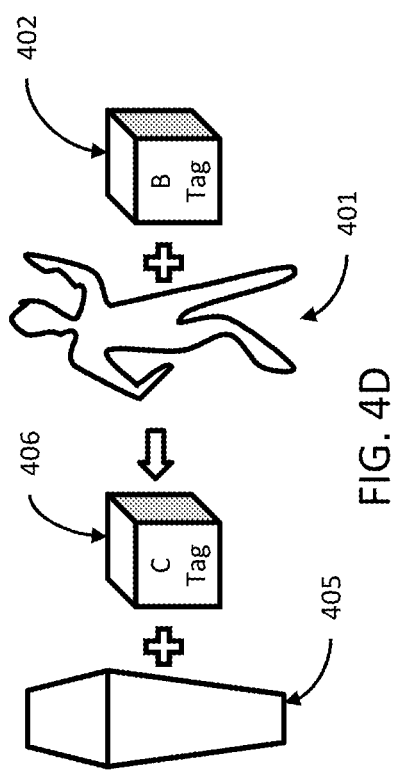

In FIG. 4D the coffin 405 associated with C tag 406 is further associated with remains 401 associated with B tag 402. FIG. 4E depicts how this further association is performed using data entry device 403. The data entry device detects the B tag and updates the basic data stored on the B tag with the basic data stored on the C tag and vice versa. Alternatively, as mentioned above, the tags could each be outfitted with antennas and configured to update each other. The basic data on the tags is then added to the basic data associated with the B tag in the record on the database component 404.

Figure 4F:
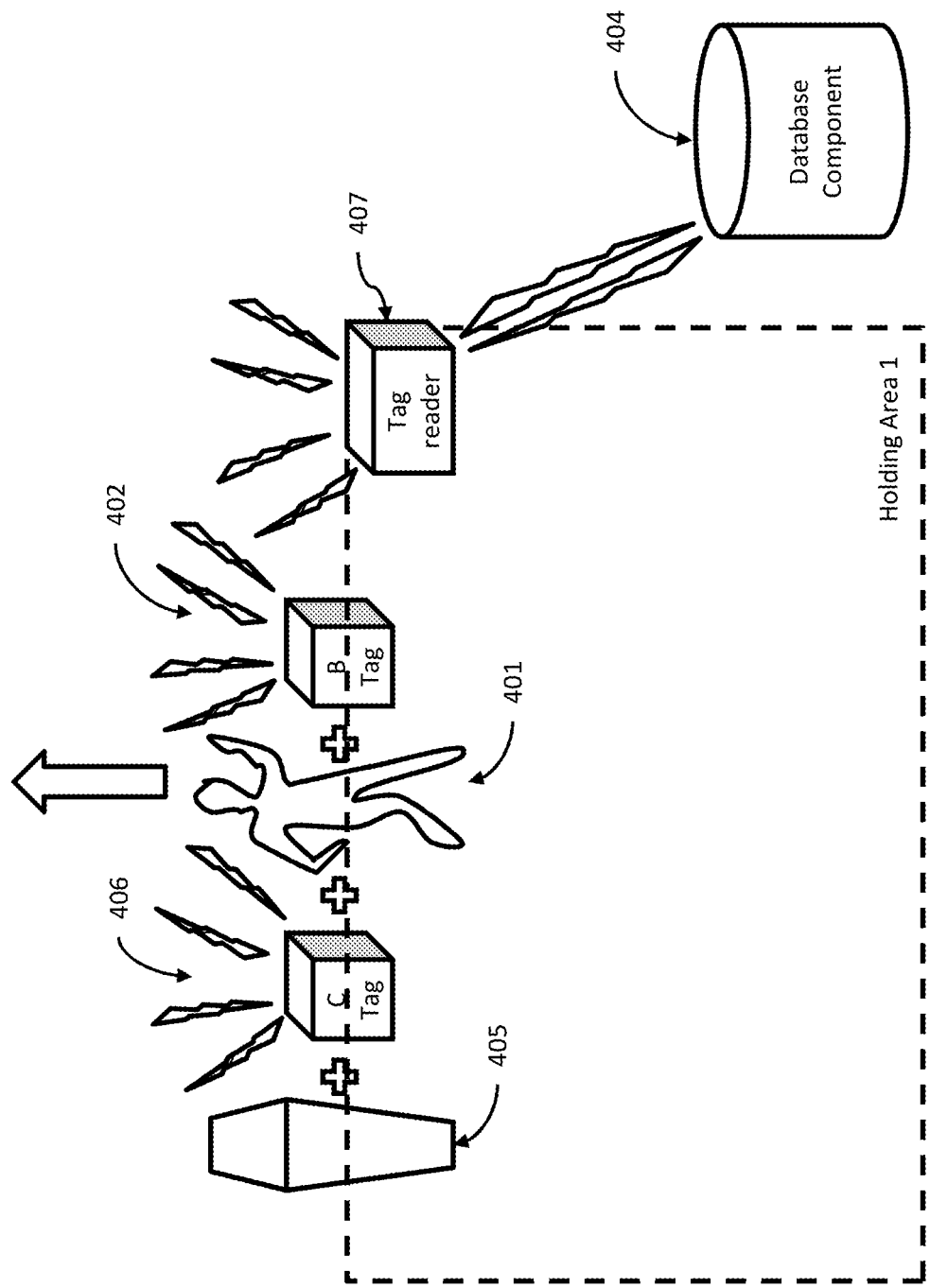
Figure 4G:
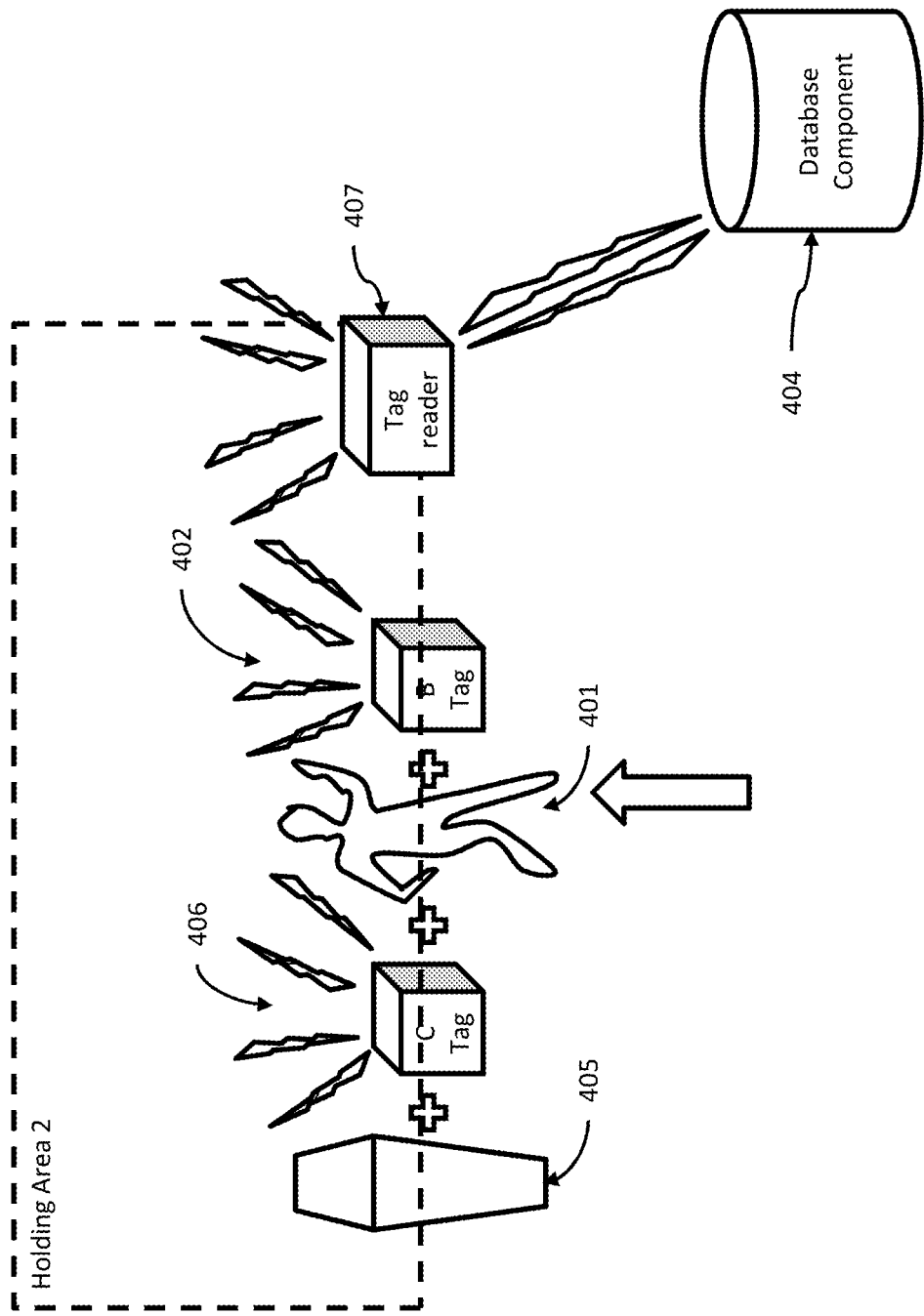

In FIG. 4F the coffin 405 associated with C tag 406 and further associated with remains 401 associated with B tag 402 are depicted exiting a Holding Area 1. For the purposes of this example, the holding area would be a morgue or similar facility. However Holding Area 1 could be any area where remains are brought, examined, and placed in a coffin. The management of what remains enter or leave such a facility is critically important to any reliable chain-of-custody system. Accordingly, tag reader 407 is placed at the exit point of the holding area represented by the dotted line and outward pointing arrow. This tag reader can function similarly to the process describe in FIG. 3. The tag reader monitors the exit point of the holding area and is operatively connected to database component 404. When the tag reader detects either tag B or tag C it checks the record stored in the database component associated with those records. The additional data stored in the record might indicate that the remains are not scheduled to depart the morgue yet, in which case, an alert would be sent to appropriate systems or personnel and the improper exit would be recorded in the record associated with the tags. However, if the remains were cleared to leave, then the additional data in the recorded would be updated to reflect the departure, and the remains would freely exit the facility. FIG. 4G depicts the arrival of the coffin 405 associated with C tag 406 and further associated with remains 401 associated with B tag 402 at Holding Area 2. For purposes of this example, Holding Area 2 would be the receiving facility or staging area at a cemetery. Strong entry and exit controls would be important at the cemetery for the same reasons they were in the morgue context. Thus tag reader 407 performs similar functions as described above with respect to FIG. 4F. In addition it would verify that the remains were scheduled to leave Holding Area 2 when the remains are leaving to be placed in a grave.

Figure 4H:
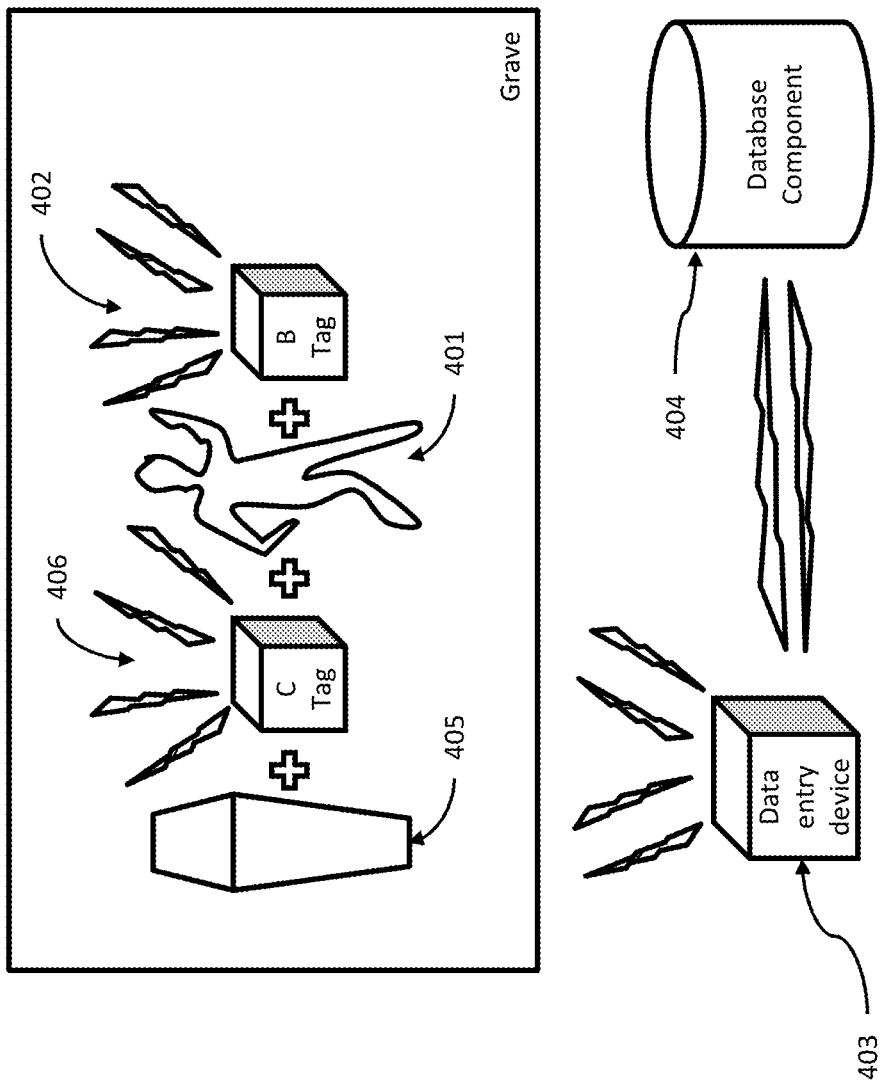

Finally FIG. 4H depicts the placement of the coffin 405 associated with C tag 406 and further associated with remains 401 associated with B tag 402 into the grave. Although a grave is probably most typical, this component could be any final resting place such as a mausoleum or columbarium. Once the remains are covered over, data entry device 403 can be used to read the B tag and the C tag and provide a final update to the basic information stored both the tags and in the record associated with the tags in the database component 406.

It should be recognized that additional steps could be taken throughout this process. For example vaults might be used to house the remains in addition to a coffin and the vaults could be associated with a supplementary tag and added to the record of the remains in the same way as the B and C tags. In similar manner, the grave stones used at the grave sites could be tagged ahead of time to be associated with a specific record to ensure the correct stones are place at the correct graves. Also, rather than use separate tag readers at the holding facilities, the card readers and data entry devices could be combined on a single mobile device that would check the remains in and out of various holding facilities by personnel. Lastly, there could be multiple additional holding areas where similar entry and exit processes would be valuable. In situations where remains travel long distance before being buried, any changeover in custody of the remains would benefit from employing a system embodying the principles of the invention.

The invention claimed is:

1. A system for tracking items, comprising
    a first longwave, magnetic signal tag component having a first basic data and configured to transmit longwave, magnetic signals having the first basic data and read longwave, magnetic signals;
    a second longwave, magnetic signal tag component having a second basic data, and configured to (a) transmit longwave, magnetic signals having the second basic data, (b) read longwave, magnetic signals, and (c) update, when the second tag reads the longwave, magnetic signal transmitted by the first tag, the second basic data by adding an association to the first basic data;
    one or more data entry device components, configured to receive information from and transmit information to the first and second signal tag components using a longwave frequency in a magnetic field and configured to receive information from and transmit information to at least one other component using one or more other transmission methods;
    one or more tag reader components, configured to receive information from the one or more signal tags using a longwave frequency in a magnetic field and configured to receive information from and transmit information to at least one other component using one or more other transmission methods; and
    one or more database components, configured to transmit information to and receive information from the one or more data entry device components and the one or more tag reader components.

2. The system of claim one, wherein the data entry device component is a tablet computer.

3. The system of claim one, wherein the other transmission methods are selected from the group consisting of WiFi, Bluetooth, UHF, VHF, and wired connections.

4. The system of claim one, wherein the system is a chain-of-custody system for human remains and at least one of the signal tag components is co-located with human remains.

5. The system of claim one, wherein the first and second signal tag components are further comprised of crystal, a battery, and static memory.

6. The system of claim one, wherein the signal tag components operate at approximately 131 kHz.

7. The system of claim one, wherein the first signal tag component updates the information stored in the second signal tag component automatically using a longwave frequency in a magnetic field.

8. A system for tracking items, comprising
a first longwave, magnetic signal tag having a first basic data and configured to transmit longwave, magnetic signals having the first basic data and read longwave, magnetic signals;
a second longwave, magnetic signal tag having a second basic data, and configured to (a) transmit longwave, magnetic signals having the second basic data, (b) read longwave, magnetic signals, and (c) update, when the second tag reads the longwave, magnetic signal transmitted by the first tag, the second basic data by adding an association to the first basic data;
one or more devices configured to read longwave, magnetic signals;
a database component operatively connected to the one or more devices configured to read longwave, magnetic signals;
a processor operatively connected to the one or more devices and the database component; and
a machine-readable storage medium encoded with computer program code operatively connected to the processor, and configured such that, when the computer program code is executed by the processor, the processor performs a method comprising the steps of
monitoring longwave, magnetic signals;
determining whether the second tag is present;
determining, if the second tag is present, whether the second basic data is associated with a record;
creating, if the second basic data is not associated with a record, a record for the second tag; and
determining, if the second basic data is associated with a record, whether circumstances at the time of detecting the second tag are consistent with the information contained in the record associated with the second tag.

9. The system of claim 8, wherein the processor and machine-readable storage medium are housed in the one or more devices configured to read longwave, magnetic signals.

10. The system of claim 8, comprising sending a notification to the database component, if the circumstances are inconsistent with the information contained in the record associated with the second tag; and updating the record associated with the second tag, if the circumstances are consistent with the information contained in the record associated with the second tag.

11. The system of claim 8, wherein the system is a chain-of-custody system for human remains and at least one of the one or more signal tag components is co-located with human remains.

12. The system of claim 8, wherein the signal tag components are further comprised of a crystal, a battery, and static memory.

13. The system of claim 8, wherein the signal tag components operate at approximately 131 kHz.

14. The system of claim 8, wherein the circumstances include the association with the first basic data.

15. The system of claim 8, wherein the one or more devices and the database component are operatively connected by transmission methods selected from the group consisting of WiFi, Bluetooth, UHF, VHF, and wired connections.

* * * * *